April 27, 1965  Z. FABIAN ET AL  3,180,525
FERTILIZER FEEDING AND METERING MECHANISM
Filed March 28, 1963  2 Sheets-Sheet 2
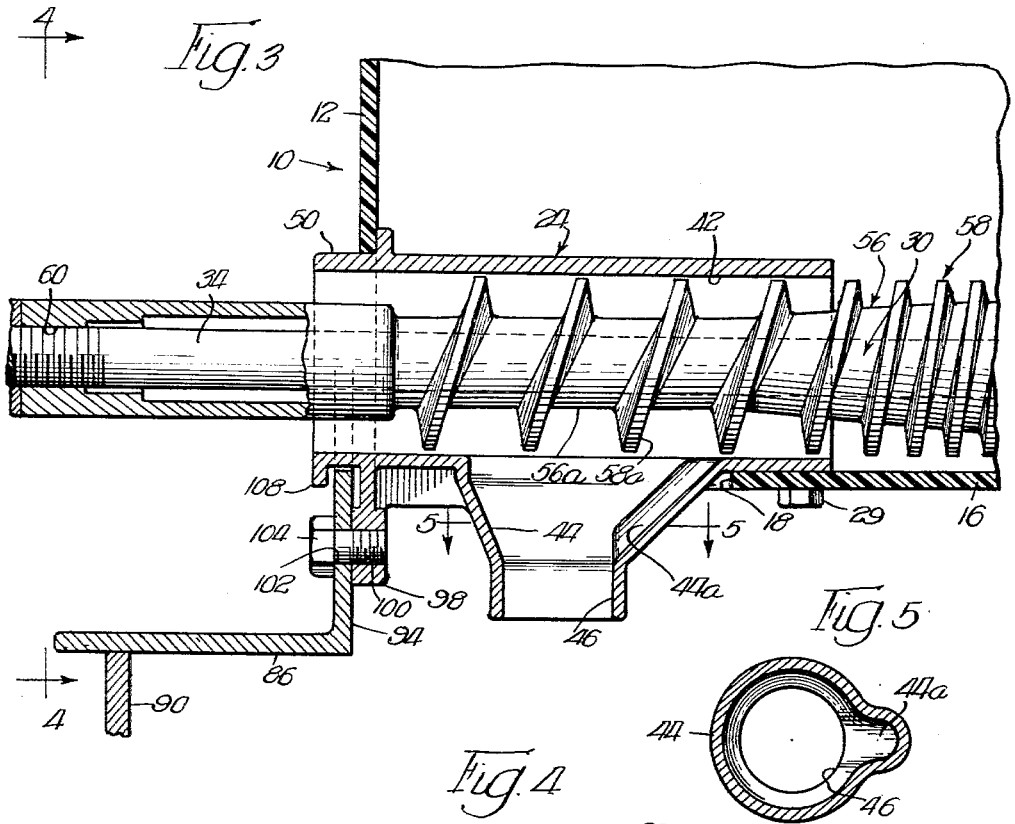
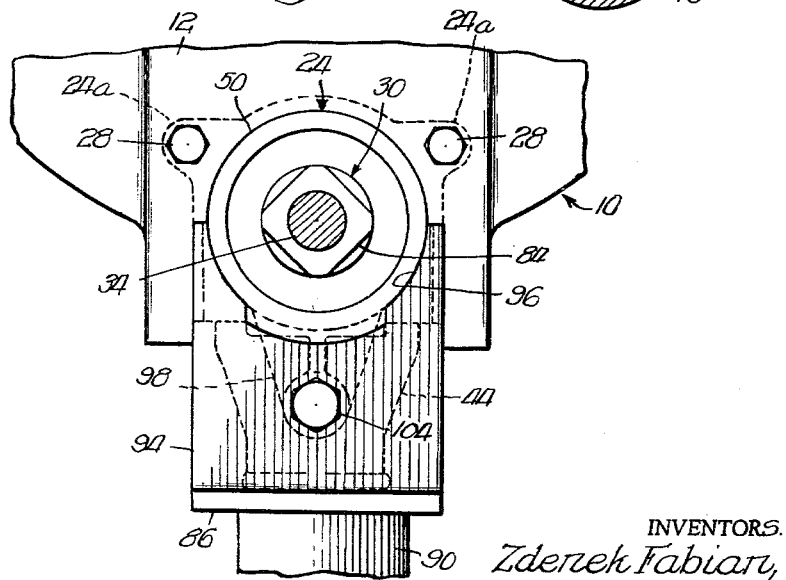
INVENTORS.
Zdenek Fabian,
BY Roy G. Brandt, 3,180,525
FERTILIZER FEEDING AND METERING
MECHANISM
Zdenek Fabian and Roy G. Brandt, South Bend, Ind.,
assignors to Oliver Corporation, Chicago, Ill., a corporation of Delaware
Filed Mar. 28, 1963, Ser. No. 268,614
13 Claims. (Cl. 222—48)

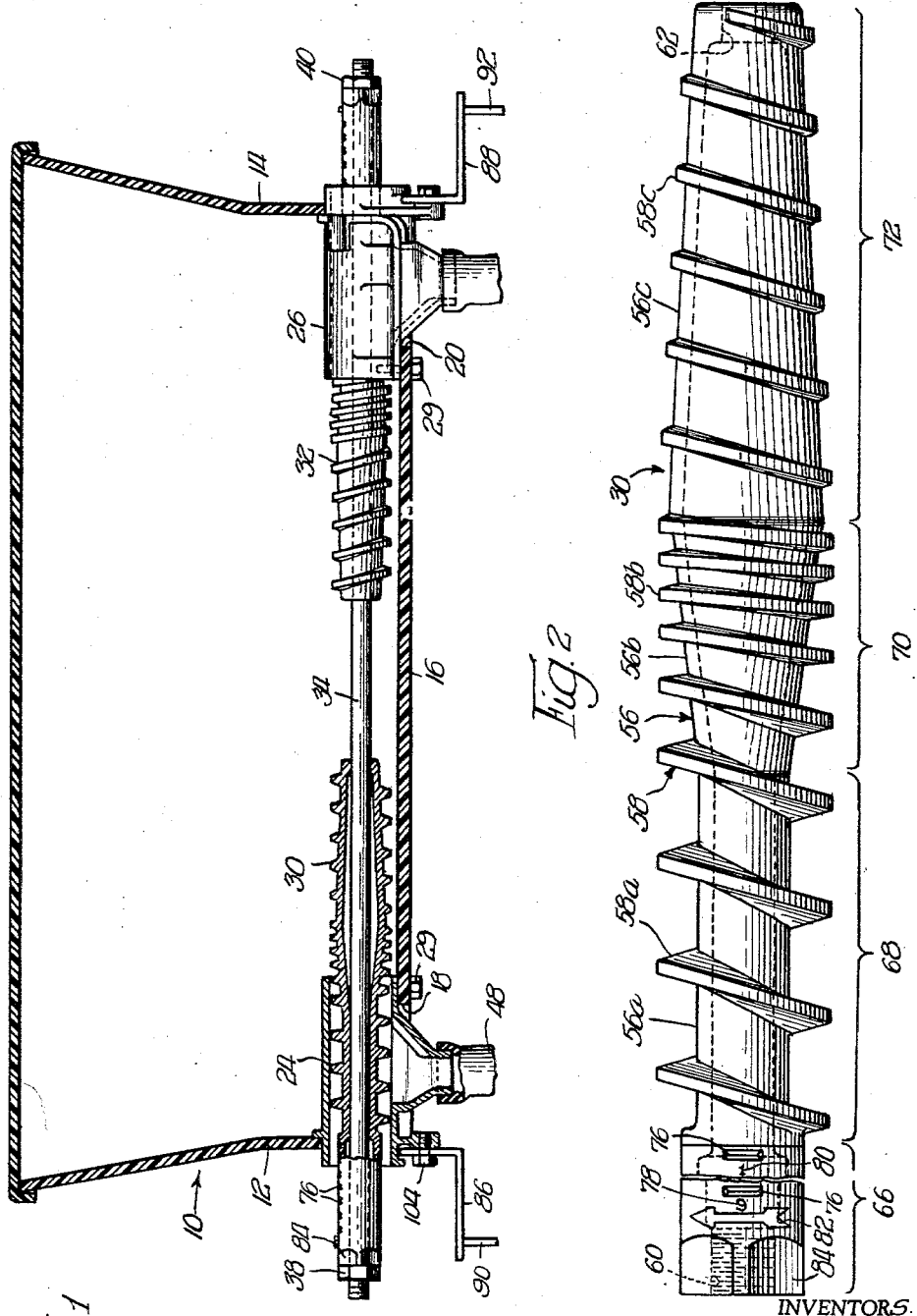

This invention relates to innovations and improvements in a fertilizer attachment for a tractor-drawn planter, and more particularly to improvements in the fertilizer feeding and metering mechanism of the fertilizer attachment.

Tractor-drawn planters having fertilizer attachments are well known agricultural implements. They operate to fertilize and plant a number of rows, e.g., four, of seed at one time. A prime requirement of such planters is their ability to plant a variety of seeds which makes it necessary that the fertilizer attachments be operable to feed fertilizer accurately from supply hoppers at various desired rates depending on a number of well known factors such as the type of seed being planted, the type of fertilizer used, the condition of the soil, etc. Obviously, the flexibility, simplicity and convenience of adjustment of the fertilizer feeding and metering mechanism is highly important particularly since the adjustments often have to be made in the field by the tractor operator.

It is a primary object of the present invention to provide a fertilizer attachment for tractor-drawn planters having novel means for controlling the rate of feed and discharge of dry granular fertilizer.

It is another object of the present invention to provide a fertilizer attachment including a hopper having an outlet chamber with an auger member disposed therein, wherein the position of the auger member in the outlet chamber may be adjusted exteriorly of the hopper for controlling the rate of feed and discharge of fertilizer material.

Another object of the present invention is to provide a fertilizer attachment including a hopper having an outlet chamber with an auger member disposed therein, which auger member is of unique construction and adjustably mounted in the hopper for controlling the rate of feed and discharge of fertilizer material.

Still another object of the present invention is to provide a fertilizer attachment including a hopper having a pair of oppositely disposed outlet housings with a pair of auger members respectively associated therewith, which outlet housings provide a pivotal support means for the hopper allowing the same to be tilted for emptying or cleaning.

Another object of the present invention is to provide a fertilizer attachment including a hopper having a pair of oppositely disposed outlet chambers with a pair of auger members respectively associated therewith, wherein the fertilizer attachment has the following features: a complete range of feeding rates obtainable without changing gears or sprockets; independent and infinite settings of each auger member to permit the feeding rate of each auger member to be the same regardless of manufacturing variations in the parts involved; minimum pulsation of the discharging fertilizer material at low operating speeds; an even feed along the length of the fertilizer hopper, elimination of boiling action from the auger members, reduction of the amount of horsepower required to rotate the augers, and reduction of the amount of wear of the augers and outlet housings; and prevention of rusting of the auger members on their supporting shaft.

These and other objects and advantages of the invention will become apparent from the following specification wherein like numerals refer to similar parts throughout.

In the drawings:

FIG. 1 is a view, partially in vertical section and partially in elevation, taken through the hopper of one embodiment of the fertilizer attachment of the present invention;

FIG. 2 is an enlarged view of one of the two variable-vane auger members of the fertilizer hopper mechanism shown in FIG. 1;

FIG. 3 is an enlarged fragmentary view, partially in vertical section and partially in elevation, showing one of the fertilizer outlet housings of FIG. 1 and a fragmentary portion of the associated auger member;

FIG. 4 is a view taken on line 4—4 of FIG. 3; and

FIG. 5 is a section taken along line 5—5 of FIG. 3.

Now referring to the drawings and particularly FIG. 1, an elongated covered fertizer hopper is generally designated 10 and includes opposite end walls 12 and 14 and a bottom 16. Hopper 10 is preferably formed of a plastic material such as so-called "fiber glass" so as to eliminate corrosion and may be of the type used on the No. 540 Planter manufactured by Oliver Corporation of South Bend, Indiana. Hopper 10 includes a pair of oppositely disposed openings 18 and 20, each of which openings may be formed by removing a portion of the bottom and end wall of the hopper at the juncture thereof. A pair of outlet housings 24 and 26 are mounted in hopper 10 in openings 18 and 20, respectively. Each outlet housing 24 and 26 is secured at the outer end thereof to the hopper wall by a pair of bolts 28, which bolts extend through openings provided in the hopper wall and threadingly engage threaded bores in integral lug portions 24a of the outlet housing. Each outlet housing is secured at the inner end thereof to the bottom of the hopper by a pair of bolts 30, which bolts extend through openings in the bottom of the hopper for threading engagement with threaded bores formed in integral lug portions (not shown) of the outlet housing. It will be understood that each outlet housing completely fills or closes the corresponding opening in the hopper, i.e., fertilizer material in the hopper 10 cannot escape through openings 18 and 20 around the exterior of housings 24 and 26. A pair of special auger members 30 and 32 are adjustably mounted on a common drive shaft 34 extending through housings 24 and 26 for positively feeding a fertilizer material into outlet housings 24, 26, respectively. The drive shaft is externally threaded along portions at opposite ends thereof, and a pair of jam nuts 38 and 40 (FIG. 1) are provided on the threaded ends of drive shaft 34 for preventing relative rotation between respective auger members 30 and 32 and the drive shaft. Both outlet housings are of identical construction, and both auger members are identical with the exception of being provided in right and left hand forms. Accordingly, it will suffice to describe in detail only one outlet housing and its associated auger member.

As best seen in FIG. 3, outlet housing 24 is generally T-shaped and includes a cylindrical, horizontally extending, outlet chamber 42 opening at the inner end thereof into hopper 10 and opening at the outer end thereof exteriorly of the hopper. Intermediate its opposite ends, housing 24 includes a downwardly extending spout portion 44 having a discharge opening 46. As seen in FIG. 5, the spout portion includes a downwardly and outwardly inclined constricted or throat portion 44a which comes into use when fertilizer material is being discharged at a low rate from the outlet housing. Operation of constricted portion 44a will be explained below. It will be understood that one end of a flexible discharge conduit 48 is adapted to be attached to the end of spout portion 44 for directing a fertilizer material from the discharge opening to the surface of the earth. Outlet housing 24 includes a generally cylindrical hub portion 50 extending horizontally and exteriorly of hopper 10 through opening 18 therein. It will be understood that outlet chamber 42 and hub portion 50 of outlet housing 24 are in co-axial alignment with the outlet chamber and hub portion of outlet housing 26.

As best seen in FIG. 2, auger member 30 includes a tubular stem 56 having an integral continuous vane 58 spirally formed thereon along substantially the entire length of the stem. Stem 56 has a bore 60 at one end thereof (FIG. 3) threaded for threading engagement with the threads on drive shaft 34. The opposite end of auger 30 has a smooth bore 62 (FIG. 2) for sliding engagement with drive shaft 34. Auger 30 may be conveniently characterized as including serially arranged sections 66, 68, 70 and 72.

Section 66 may be termed an indicator section, and it includes indicia means in the form of a series of axially spaced-apart raised or embossed graduation marks 76 with corresponding numerals 78 associated therewith. Indicator section 66 includes further indicia means in the form of a transversely extending arrow 82. Auger section 66 also includes a plurality of flat faces 84 at the end of the auger member adapting the latter to be engaged by a wrench or like tool.

Auger section 68 is defined by a stem portion 56a of uniform diameter and by a vane portion 58a having spirals of uniform pitch, diameter and spacing.

Auger section 70, which may be termed a variable vane section, is defined by a conical or tapered stem section 56b and by a vane portion 58b having spirals of uniform outside diameter but of varying pitch and spacing. It will be noted that the spirals of vane portion 58b have the same outside diameter as the spirals of vane portion 58a. As noted in FIG. 2, the pitch and spacing of adjacent spirals of vane portion 58b increase as the vane approaches adjacent vane portion 58a. As the spirals of vane portion 58b have a constant outside diameter and as stem portion 56b decreases in diameter as it approaches adjacent stem portion 56a, the height of the spirals of vane portion 58b gradually increase along the length thereof in a direction toward vane portion 58a. Stated another way, the spiral space between adjacent spirals of vane portion 58b at the end of section 70 adjacent section 68 is greater than the spiral space between adjacent spirals of vane portion 58b at the end of section 70 adjacent section 72, and the capacity of the spiral spaces is a function of two factors, viz., height of the vane spirals and spacing of the vane spirals.

Section 72 is defined by a tapering stem portion 56c, which stem portion uniformly decreases in diameter as it approaches the end of the auger member, and by a vane portion 58c having spirals of uniform pitch, spacing and height.

Referring again to FIG. 3, it will be seen that auger member 30 is mounted on drive shaft 34 with a portion of the auger member intermediate the ends thereof being disposed in the outlet chamber of outlet housing 24. The outside diameter of the spirals of vane portions 58a and 58b is slightly less than the diameter of outlet chamber 42 to allow for free rotation and support of the auger member in the outlet housing. The auger member is axially positioned on the drive shaft so that a portion of variable vane section 70 lies within the end of the outlet chamber opening into the hopper. It will be recalled that bore 60 of the auger member is threaded for threading engagement with the external threads on the drive shaft. Tightening of jam nut 38 (FIG. 1) against the exterior end of the auger member 30 secures the auger member to the drive shaft thereby preventing relative rotation between the drive shaft and auger 30 upon rotation of the former. Thus, rotation of drive shaft 34, which may be accomplished from a power takeoff from the above referred to No. 540 Planter, results in rotation of auger member 30 for positively feeding a fertilizer material in the hopper into outlet chamber 42 for discharge through aperture 46. The rate of fertilizer material being discharged may be controlled or varied by axial adjustment of auger member 30 on the drive shaft. Axial adjustment or movement of auger member 30 on drive shaft 34 is readily accomplished by loosening and backing off jam nut 38 followed by rotation of auger member 30. Auger member 30 may be rotated by hand by grasping indicator section 66 or by engaging faces 84 with a suitable wrench. The drive shaft will be prevented from rotating by virtue of its power take-off connection. Auger member 30 is rotated in one direction until the desired length of variable vane section 70 is inserted within the inner end of outlet chamber 42. Manifestly, axial movement of auger 30 outwardly of the hopper provides for a decreased rate of material being dispensed from the hopper because of the smaller spiral spaces and reduced pitch of the vanes at the end of section 70 adjacent section 72. The size of the spiral spaces is a function of vane height and spacing. In other words, when auger 30 is moved outwardly of the hopper to a position wherein the end of variable vane section 70 adjacent section 72 is disposed within the inner end of the outlet chamber, for every revolution of the auger member a relatively small amount of fertilizer material will be permitted to enter the outlet chamber. On the other hand, when auger member 30 is moved inwardly in the hopper to a position where the end of the variable vane section adjacent section 68 is disposed within the end of outlet chamber communicating with the hopper, each revolution of the auger member will result in a greater amount of fertilizer material being advanced into the outlet chamber because of the larger spiral spaces and increased pitch of the vanes. Manifestly, the increased pitch of the vane results in moving material a greater axial distance per revolution of the auger member. It will be appreciated that the construction of the auger members provide a means of controlling or varying the rate of discharge of fertilizer material which is independent of the speed of rotation of the auger. Therefore, the feeding rate may be varied without changing gears, sprockets, etc. Further, it will be realized that the auger members permit the rate of fertilizer discharge to be varied over an infinite number of rates because of the uniform taper of the auger stem in the variable vane section.

Indicator section 66 of auger member 30 serves as a means for indicating to an operator the axial position of the auger member on the drive shaft. Rotation of the auger member 30 relative to drive shaft 34 until one of the marks 76 is aligned with the outer end of the outlet chamber serves to indicate the axial position of the auger member in the outlet housing. Arrow 82 indicates the direction an auger member is to be rotated for feeding material into its associated housing. Arrow 82 serves to indicate that a pair of auger members are properly mounted on the drive shaft in right and left hand forms.

Referring again to FIG. 1, it will be apparent that the indicator sections permit auger members 30 and 32 to be axially adjusted on the drive shaft to provide the same amount of entry of the auger members in respective outlet housings for discharging fertilizer material at the same rate from both outlet housings. Of course, if necessary, the auger members may be individually adjusted to different positions in respective outlet housings to compensate for manufacturing tolerances in the auger members and outlet housings thereby providing for the same rate of discharge from both outlet housings. Both augers may be simultaneously adjusted by backing off nuts 38 and 40 and rotating the drive shaft while preventing the auger members from rotating. The auger members may be prevented from rotation during rotation of the drive shaft by being engaged by hand or by wrench or by engagement of the inner ends of the auger members with a fertilizer material in the hopper. Of course, as pointed out above both auger members may be quickly and easily adjusted as desired by backing off jam nuts 38 and 40 and then rotating the auger members relative to the drive shaft until the desired marks on the indicator sections lie within the outer ends of the outlet chambers. It should also be noted that both auger members may be quickly and easily removed from the outlet chambers for cleaning purposes, etc., by withdrawing drive shaft 34 from the hopper. Removal of the auger members in this manner is accomplished without disturbing their axial position of the drive shaft.

Tapered section 72 of auger member 30 is adapted to lie within the hopper adjacent the bottom of the latter for feeding and advancing fertilizer material toward the inner end of outlet chamber 42. Among other things, the tapered section of auger member 30 provides for a more even feed of fertilizer material toward outlet chamber 42, eliminates a boiling action of fertilizer material within the hopper, reduces the amount of horsepower required to rotate the auger member and reduces the wear of the auger member.

It should be noted that the annular spaces between the inside of each auger member and the outside of drive shaft 34 may be filled with grease to prevent rusting or corroding between these two parts. Keeping these annular spaces filled with grease insures ease of movement of the auger members with respect to the drive shaft during adjustment of the former.

It will be understood that when auger member 30 is adjusted for positively feeding fertilizer material into outlet chamber 42 at average maximum rates, a considerable amount of the capacity of spout 44 is used in funneling and directing fertilizer material to discharge opening 46. However, when auger member 30 is adjusted for feeding fertilizer material at a relatively low rate into outlet chamber 42, substantially all of the material discharged passes through constricted portion 44a, which portion is near the inlet end of the outlet chamber. Portion 44a has a cross-sectional area substantially less than the cross-sectional area of the major portion of spout 44. At low rates of discharge spout portion 44a tends to maintain fertilizer material in a steady stream thereby minimizing pulsation or intermittent discharge of the material when the auger member is adjusted at a low operating rate.

Hopper 10 is supported on a pair of oppositely disposed right angle supports 86 and 88 (FIG. 1), which supports are secured to suitable frame members 90 and 92, respectively, which may be a part of the above referred to No. 540 Planter. As both supports are of identical construction, a description of one will suffice.

As seen in FIGS. 3 and 4, support 86 is in the form of an angle member having an upstanding leg 94, which leg has an arcuate cradle or recess 96 formed in the upper edge thereof for rotatably receiving hub portion 50 of outlet housing 24. Rotation of hub 50 in recess 96 is prevented by the provision of a depending lug portion 93 integral with the outlet housing, which lug has a threaded bore 100 adapted for alignment with a smooth bore 102 provided in upstanding leg 94, bores 100 and 102 being adapted to receive a locking bolt 104. Bolt 104 is adapted for threading engagement with the threads in bore 100. It will be apparent that removal of bolt 104 will permit rotation of hub 50 in recess 96 of a saddle support 86. This construction permits hopper 10 to be tilted forwardly or rearwardly to a generally horizontal position for emptying or cleaning, etc. This movement of the hopper does not disturb the position of the auger members in respective outlet housings. Hub 50 is provided with a depending arcuate flange 108 for reducing the likelihood of separation of hub 50 from recess 96 when the locking bolt has been removed. It will be apparent that hopper 10 may be completely separated from the supports by removal of the drive shaft followed by removal of both locking bolts.

While the invention has been shown in but one form it will be obvious to those skilled in the art that it is not to be so limited, but on the contrary the invention is susceptible of various changes and modifications without departing from the spirit and scope of the appended claims. For example, hopper 10 may be provided with only one outlet housing and auger member in which case the inner end of drive shaft 34 may be suitably journalled within the hopper.

We claim:

1. In a planter fertilizer attachment of the class described, a hopper having a cylindrical outlet chamber in the bottom thereof, which chamber opens at the inner end thereof into said hopper and which chamber communicates with a discharge opening, an auger in said hopper co-axial with said chamber with one end of the auger being disposed within the chamber, said auger having a variable vane section along the length thereof entering said inner end of the chamber for feeding a fertilizer material thereinto, a drive shaft coaxial with said outlet chamber and extending through the same, said auger being movably mounted on said drive shaft in co-axial relation with the latter, adjustment means for adjustably mounting said auger axially on said drive shaft, said auger being arranged, adapted and associated with said adjustable means so that adjustment of the latter may be accomplished exteriorly of the hopper, whereby the amount of entry of said section in said one end of the chamber may be adjusted to control the rate of fertilizer material being fed thereinto.

2. In a planter fertilizer attachment of the class described, a hopper having a cylindrical outlet chamber in the bottom thereof adjacent a wall of the hopper, which chamber opens at the inner end thereof into said hopper and opens at the outer end thereof exteriorly of said hopper, an auger member in said hopper co-axial with said chamber with a portion of the auger member being disposed within the chamber and with one end of the auger member being disposed exteriorly of the hopper, said auger member having a variable vane section along the length thereof entering said inner end of the chamber for feeding a fertilizer material thereinto, a drive shaft coaxial with said outlet chamber and extending through the same with at least one end of the drive shaft being disposed exteriorly of the hopper, said auger member being movably mounted on said drive shaft in coaxial relation with the latter, adjustment means associated with said drive shaft adjacent said one end of the auger member for positioning the latter axially on said drive shaft, whereby the amount of entry of said section in said inner end of the chamber may be adjusted for controlling the rate of fertilizer material being fed thereinto.

3. The structure according to claim 2 wherein said auger member is provided with an indicator section adjacent said one end thereof, which indicator section includes axially spaced-apart indicia means entering said other end of the chamber for indicating the axial position of the auger member in the chamber.

4. The structure according to claim 2 wherein said auger member includes a stem having a continuous vane spirally formed around the stem along a portion of the length thereof and wherein said variable vane section is defined by uniformly varying the diameter of said stem along the length of said section and by providing the spirals of said continuous vane with a uniform outside diameter along the length of said section.

5. The structure according to claim 4 wherein the spacing of the spirals of said continuous vane is uniformly increased along the length of said section toward said one end of the auger member.

6. The structure according to claim 4 wherein the pitch of said continuous vane is uniformly increased along the length of said section toward said one end of the auger member.

7. In a planter fertilizer attachment of the class described, a hopper having a cylindrical outlet chamber in the bottom thereof adjacent a wall of the hopper, which chamber opens at the inner end thereof into said hopper and opens at the outer end thereof exteriorly of said hopper, an auger member in said hopper co-axial with said chamber with a portion of the auger member intermediate the ends thereof being disposed within the chamber for feeding a fertilizer material thereinto, said auger member including a stem having a continuous vane spirally formed thereon for a portion of the length thereof and said auger member being characterized by a variable vane section intermediate the ends thereof entering said inner end of the chamber, a first vane section adjacent said variable vane section and disposed within the outlet chamber and a second vane section adjacent said variable vane section and extending to the inner end of the auger member, a drive shaft coaxial with said outlet chamber and extending through the same with at least one end of the drive shaft being disposed exteriorly of the hopper, said auger member being movably mounted on said drive shaft in coaxial relation with the latter, adjustment means associated with said end of the drive shaft and the outer end of the auger member for positioning the latter axially on said drive shaft, whereby the amount of entry of said variable vane section in said inner end of the chamber may be adjusted for controlling the rate of fertilizer material being fed thereinto.

8. The structure according to claim 7 wherein said first vane section is defined by said stem being of uniform diameter and by said vane being spiralled at a uniform diameter, wherein said variable vane section is defined by said stem being uniformly tapered and by said vane being spiralled at variable spacings, and wherein said second vane section is defined by said stem being tapered toward the inner end of the auger member and by said vane being spiralled and provided with a constant height.

9. In a planter fertilizer attachment of the class described, a hopper having an opening therein at the juncture at the end wall and bottom of the hopper, a generally T-shaped outlet housing secured to said hopper in the opening therein, said housing including an upper horizontal outlet chamber and a depending spout portion communicating with the outlet chamber intermediate the ends of the latter, which chamber opens at the inner end thereof into said hopper and opens at the outer end thereof exteriorly of said hopper, an auger member in said hopper co-axial with said chamber with a portion of the auger member being disposed within the chamber and with one end of the auger member being disposed exteriorly of the hopper through said outer end of said chamber, said auger member having a variable vane section along the length thereof entering said inner end of the chamber for feeding a fertilizer material thereinto, a drive shaft extending through said outlet chamber in coaxial relation therewith, said auger member being movably mounted on said drive shaft in coaxial relation with the latter, adjustment means associated with said drive shaft adjacent said one end of the auger member for positioning the latter axially on said drive shaft, whereby the amount of entry of said section in said inner end of the chamber may be adjusted for controlling the rate of fertilizer material being fed thereinto.

10. The structure according to claim 9 wherein said spout portion includes a constricted portion opening into said chamber nearer the inner end of the chamber than the outer end thereof, said constricted portion being adapted to collect into a continuous stream substantially all fertilizer material discharged when said auger member feeds fertilizer material at a relatively low rate, whereby pulsation of fertilizer material being discharged is minimized.

11. In a planter fertilizer attachment of the class described, a hopper having opposite end walls and a pair of co-axial cylindrical outlet chambers in the bottom of the hopper adjacent said end walls, respectively, each of said chambers opening at the inner end thereof into said hopper and opening at the outer end thereof exteriorly of said hopper, a pair of auger members in said hopper operatively associated with respective outlet chambers, each of said auger members being co-axial with said chambers with a portion of each auger member being disposed within the corresponding chamber and with one end of each auger member being disposed exteriorly of the hopper, each of said auger members having a variable vane section along the length thereof entering said inner end of the corresponding chamber for feeding a fertilizer material thereinto, a common drive shaft extending through both of said chambers, each of said auger members being movably mounted on said common drive shaft in coaxial relation with the latter, separate adjustment means associated with said drive shaft adjacent said one end of respective auger members for positioning the latter axially on the drive shaft, whereby the amount of entry of said sections in said inner ends of the chambers may be adjusted for controlling the rate of fertilizer material being fed thereinto.

12. The structure according to claim 11 wherein each of said auger members is provided with an indicator section adjacent said one end thereof, which indicator section includes axially spaced-apart indicia means entering said outer end of the corresponding chamber for indicating the axial position of the auger member in the chamber.

13. In a planter fertilizer attachment of the class described, a hopper having opposite end walls each being provided with an opening therein adjacent the bottom of the hopper, a pair of outlet housings mounted in said hopper in said openings, respectively, each of said housings having one end thereof in the form of a cylindrical hub extending exteriorly of said hopper through the corresponding opening in the latter and being co-axial with the cylindrical hub of the other of said outlet housings, each of said outlet housings having a cylindrical outlet chamber opening at the inner end thereof into said hopper and opening at the outer end thereof at said one end of the outlet housing and being co-axial with the outlet chamber of the other of said outlet housings, a pair of oppositely disposed hopper supports adapted to receive rotatably said cylindrical hubs, respectively, separate locking means engageable with each of said supports and the corresponding outlet housing for preventing rotation therebetween and thereby preventing rotation of the hopper, a pair of auger members in said hopper operatively associated with respective outlet housings, each of said auger members being co-axial with said outlet chambers with a portion of each auger member being disposed within the corresponding outlet chamber and with one end of each auger member being disposed exteriorly of the corresponding cylindrical hub, each of said auger members having a variable vane section along the length thereof entering said inner end of the corresponding outlet chamber for feeding a fertilizer material thereinto, each of said auger members being movably mounted on a common drive shaft extending axially of the auger members and beyond said one end of the latter, separate adjustment means associated with said drive shaft adjacent said one end of the auger members for positioning the latter axially on said drive shaft, whereby the amount of entry of said sections in said inner ends of the outlet chambers may be adjusted for controlling the rate of fertilizer material being fed thereinto.

References Cited by the Examiner

UNITED STATES PATENTS

| 102,997 | 5/70 | Whelphley et al. | 222—413 X |
| 327,253 | 9/85 | Gosman | 222—285 |
| 1,331,017 | 2/20 | Levmann | 222—413 X |
| 3,027,050 | 3/60 | Hansen | 222—272 X |

LOUIS J. DEMBO, *Primary Examiner.*